(12) United States Patent  
Banerjee et al.

(10) Patent No.: US 10,805,728 B2  
(45) Date of Patent: *Oct. 13, 2020

(54) WIRELESS AUDIO SYNCHRONIZATION

(71) Applicant: Bose Corporation, Framingham, MA (US)

(72) Inventors: Debasmit Banerjee, Everett, MA (US); Michael William Elliot, Grafton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,957

(22) Filed: Sep. 30, 2019

(65) Prior Publication Data

US 2020/0037075 A1   Jan. 30, 2020

Related U.S. Application Data

(63) Continuation of application No. 15/790,465, filed on Oct. 23, 2017, now Pat. No. 10,433,057.

(51) Int. Cl.
| | |
|---|---|
| *H04R 3/12* | (2006.01) |
| *H04R 27/00* | (2006.01) |
| *H04R 5/04* | (2006.01) |
| *H04J 3/06* | (2006.01) |
| *H04W 56/00* | (2009.01) |

(52) U.S. Cl.  
CPC ............. *H04R 3/12* (2013.01); *H04J 3/0632* (2013.01); *H04J 3/0641* (2013.01); *H04J 3/0667* (2013.01); *H04R 5/04* (2013.01); *H04R 27/00* (2013.01); *H04W 56/0015* (2013.01); *H04R 2227/003* (2013.01); *H04R 2227/005* (2013.01); *H04R 2420/07* (2013.01)

(58) Field of Classification Search  
CPC ............. H04R 3/12; H04R 5/04; H04R 27/00  
USPC ................... 700/94; 381/80, 81, 56, 98, 303  
See application file for complete search history.

(56) References Cited

U.S. PATENT DOCUMENTS

| | | | |
|---|---|---|---|
| 10,334,306 B2* | 6/2019 | Mackay | H04N 21/43615 |
| 2011/0218656 A1* | 9/2011 | Bishop | H04L 65/4084 |
| | | | 700/94 |
| 2017/0273044 A1* | 9/2017 | Alsina | H04L 67/104 |
| 2018/0020309 A1* | 1/2018 | Banerjee | H04R 5/04 |
| 2018/0234765 A1* | 8/2018 | Torok | H04R 3/12 |

* cited by examiner

*Primary Examiner* — Melur Ramakrishnaiah

(57) ABSTRACT

An audio distribution system includes an audio source; and a plurality of audio playback devices in communication with each other and with the audio source. A group of the audio playback devices are arranged to render audio content provided by the audio source in synchrony. One of the audio playback devices within the group is configured as an audio master which distributes audio content from the audio source to the other audio playback devices within the group, and one of the plurality of audio playback devices, other than the audio master, is configured as a clock master, which distributes clock information that the group of audio playback devices synchronizes to.

20 Claims, 6 Drawing Sheets

WIRELESS AUDIO SYNCHRONIZATION

RELATED APPLICATIONS

This application is a continuation application and claims benefit of U.S. patent application Ser. No. 15/790,465 filed Oct. 23, 2017, titled "WIRELESS AUDIO SYNCHRONIZATION", the contents of which are incorporated by reference herein in their entirety.

BACKGROUND

This disclosure relates to wireless audio synchronization.

SUMMARY

All examples and features mentioned below can be combined in any technically possible way.

In one aspect, an audio distribution system includes an audio source; and a plurality of audio playback devices in communication with each other and with the audio source. A group of the audio playback devices are arranged to render audio content provided by the audio source in synchrony. One of the audio playback devices within the group is configured as an audio master which distributes audio content from the audio source to the other audio playback devices within the group, and one of the plurality of audio playback devices, other than the audio master, is configured as a clock master, which distributes clock information that the group of audio playback devices synchronizes to.

Implementations may include one of the following features, or any combination thereof.

In some implementations, the system includes an access point, and the system is configured to select the clock master from among the plurality of audio playback devices based on ping times between the audio playback devices of the plurality of audio playback devices and the access point.

In certain implementations, the system is configured to select the audio master from among the group of audio playback devices prior to the selection of the clock master.

In some cases, the system is configured to exclude the audio master from consideration when selecting the clock master.

In certain cases, the system is configured to select the clock master from among the plurality of audio playback devices, excluding the audio master, based on the audio playback device that reports the shortest ping time with the access point.

In some examples, the system is configured to select the audio master from among the group of audio playback devices after the selection of the clock master.

In certain examples, respective clocks on the audio playback devices of the group of audio playback devices are synchronized to that of the clock master prior to the selection of the audio master.

In some implementations, the system is configured to exclude the audio playback device selected to serve as the clock master from consideration when selecting the audio master.

In certain implementations, the system is configured such that if the audio playback device that is selected to serve as the clock master is also selected to serve as the audio master, then the system will select a new clock master.

In some cases, respective clocks on the audio playback devices within the group of audio playback devices remain synchronized while the system selects a new clock master.

In certain cases, in response to a loss in a connection between one or more of the audio playback devices of the group of audio playback devices and the clock master, the system is configured to select a new clock master, and the audio playback devices within the group of audio playback devices are configured to continue synchronized playback while a new clock master is selected.

In some examples, the respective clocks of the audio playback devices within the group of audio playback devices are synchronized to that of the clock master according to a linear time model m(x)+b, where m is a rate difference (e.g., a difference in frequency between crystal oscillators) between the clock master's clock and the clock of the audio playback device that is synchronizing to the clock master's clock; x represents the current clock time according the clock of the audio playback device that is synchronizing to the clock master's clock; and b is an offset between the clock master's clock and the clock of the audio playback device that is synchronizing to the clock master's clock.

In certain examples, m is a rate difference between the clock master's clock and the clock of the audio playback device that is synchronizing to the clock master's clock, and b is an offset between the clock master's clock and the clock of audio playback device that is synchronizing to the clock master's clock.

In some implementations, m and b are determined by performing a linear fit of collected timestamps from the clock master (i.e., timestamped communications received from the clock master) and the clock (a/k/a "local clock") of the audio playback device that is synchronizing to the clock master's clock over a given window of time.

In certain implementations, once a new clock master is selected, the other audio playback devices within the group of audio playback devices adjust their clocks to that of the new clock master using a heuristic approach which causes the audio playback devices of the group of audio playback devices to adjust their respective m and b values based on the new master clock, while the new clock master reduces its rate to zero such that value of m for the new clock master equals 1 and the value of b for the new clock master equals zero.

In some cases, the system includes a controller that is configured to enable a user to select two or more audio playback devices from the plurality of audio playback devices to form the group of audio playback devices.

In certain cases, the system is configured to select the audio playback device from the group of audio playback devices that a user selected as a basis for the group of audio playback devices to be the audio master.

In some examples, the clock master is not one of the audio playback devices in the group of audio playback devices.

In certain examples, the clock master is one of the audio playback devices in the group of audio playback devices.

In some implementations, the system is configured to exclude any audio playback devices that are not within the group of audio playback devices from consideration when selecting the clock master.

Implementations may provide one or more of the following advantages.

In some implementations, the separation of audio and clock masters can help to eliminate the need for resynchronization when the audio master changes.

In certain implementations, the separation of audio and clock masters can help to avoid an interruption of audio playback during clock master recovery (on power loss).

In some cases, the clocks of networked audio playback devices can be pre-synchronized to reduce a delay before the start of audio playback.

DETAILED DESCRIPTION

Some known whole home audio systems consist of a plurality of audio player units, which may be arranged in various rooms throughout a home, and which communicate with each other over a local area network (LAN). Generally, one or more of the player units has access to a source of audio content, which may be a source available over a wide area network (WAN), such as an Internet radio station. Typically, two or more of the individual units can be grouped together, at a user's discretion, into what is often referred to as a zone, in which the grouped player units within the zone playback (render) audio content in synchrony.

To facilitate synchronized playback, one of the units (a master unit) will distribute audio content along with timing (clock) information that one or more of the other units (slave units) use to render the content in lock step with the master. Each of the slave devices can adjust its respective clock, or a rendering time prescribed to the audio content, based on the clock time provided by the master device (i.e., the master's clock time). This can allow the plurality of player units, each with its own clock, to synchronize the rendering of the audio content. Thus, these existing systems rely on a single master unit to serve as both an audio master as well as a clock master.

This disclosure is based on the realization that it can be beneficial to separate the roles of the audio master and the clock master.

Figure 1:
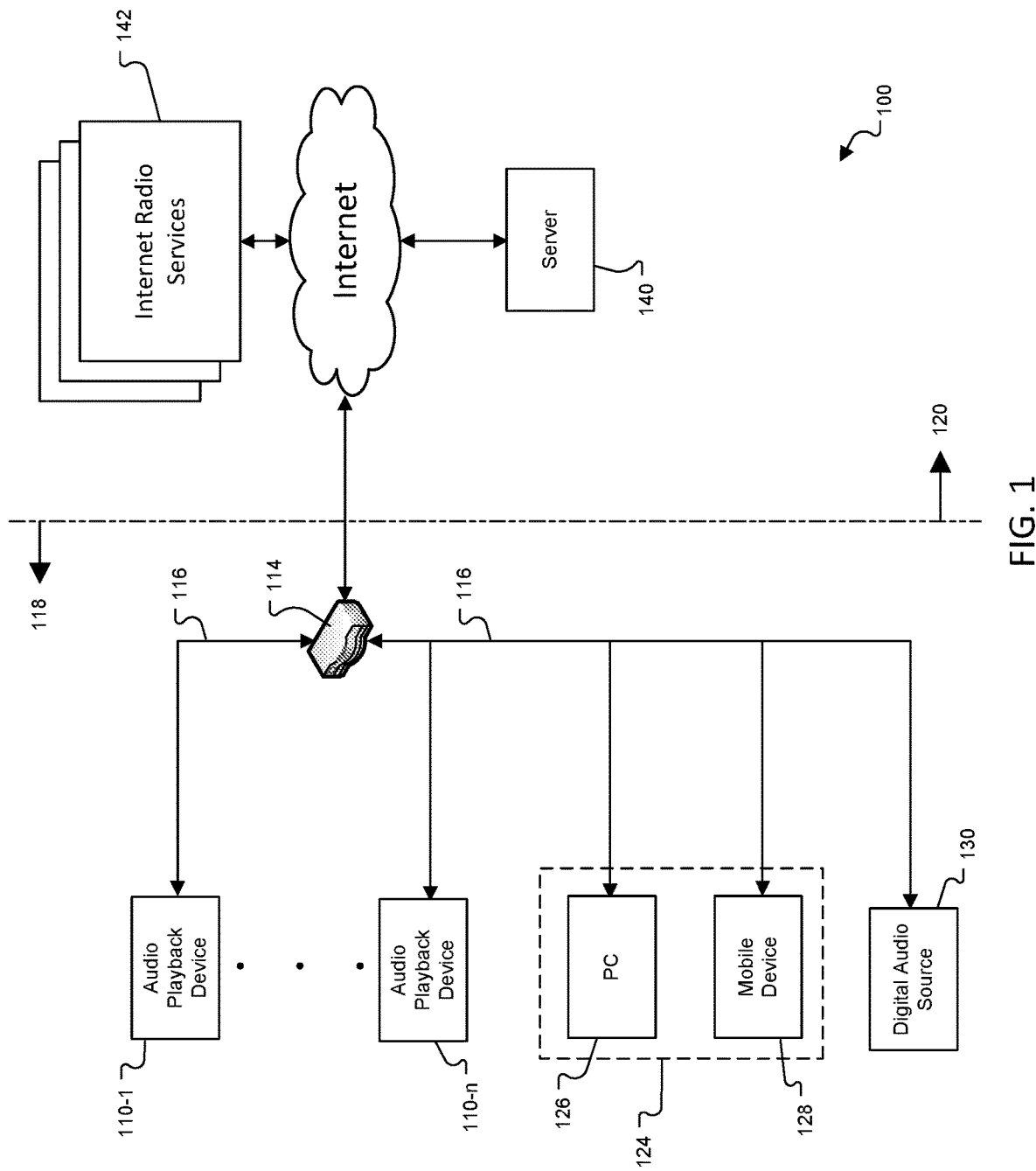
FIG. 1 is a schematic block diagram of an audio distribution system.

Audio distribution system 100, FIG. 1, can be used to accomplish a method for distributing audio data to, and synchronizing audio data among, a plurality of audio playback devices (e.g., wireless speakers) that are connected to a network. The system 100 is adapted to deliver digital audio (e.g., digital music) and includes a number of audio playback devices 110-1-110-n (collectively referenced as 110). In one non-limiting embodiment, the audio playback devices 110 are identical devices that each include a digital to analog converter that can receive digital audio signals and convert them to analog form. The audio playback devices 110 also include an electro-acoustic transducer that receives the analog audio signals and transduces them into sound. The audio playback devices also include a processor. The audio playback devices are connected to one another and also connected to local router/access point 114 via a network 116. The audio playback devices are thus able to communicate with one another. The network 116 can be a wired and/or wireless network, and can use known network connectivity methodologies. The network 116 is part of a local area network (LAN) 118 which is connected to a wide area network (WAN) 120, in this non-limiting example by connection to Internet 122. The LAN 118 also includes one or more separate computing devices 124 and one or more separate local digital audio sources 130. In this non-limiting example, the computing devices include a personal computer 126 and a mobile computing device 128 such as a smart phone, tablet or the like. The WAN 120 includes server 140 and Internet radio service 142 which can both communicate with the LAN via Internet 122.

One use of the system 100 is to play digital audio data, including but not limited to an audio stream, over one or more of the audio playback devices 110. The sources of digital audio provide access to content such as audio streams that move over network 116 to the audio playback devices. The sources of such audio streams can include, for example, Internet radio stations and user defined playlists. Each of such digital audio sources maintains a repository of audio content which can be chosen by the user to be played over one or more of the audio playback devices. Such digital audio sources can include Internet-based music services such as Pandora®, Spotify® and vTuner®, for example. Network attached storage devices such as digital audio source 130, and media server applications such as may be found on a mobile computing device, can also be sources of audio data. In a non-limiting example, the user selects the audio source and the playback devices via a user interface provided by a PC 126 and/or a mobile device 128.

Figure 2:
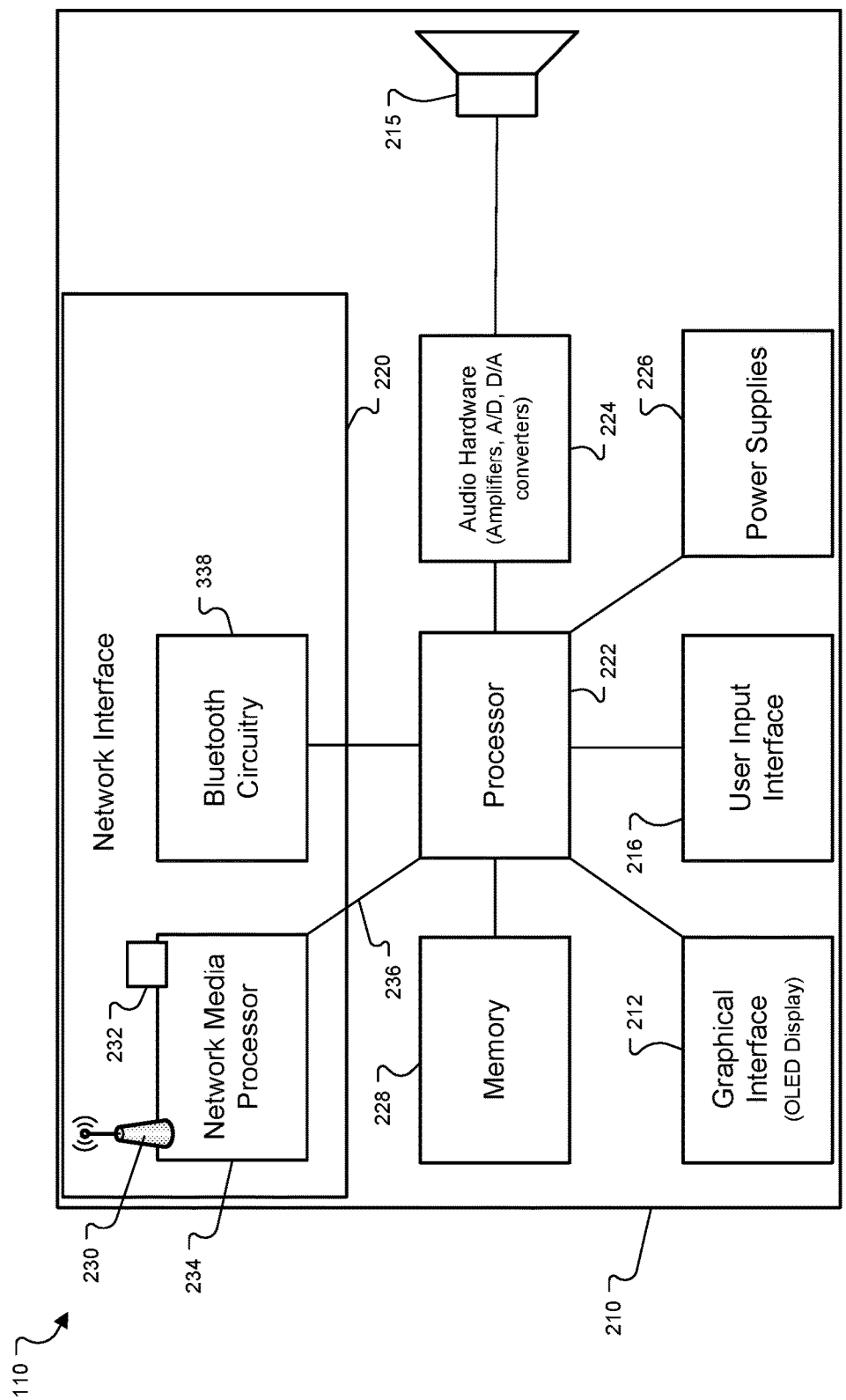
FIG. 2 is a schematic diagram of an audio playback device from the system of FIG. 1.

FIG. 2 illustrates an exemplary audio playback device 110 as an example of this disclosure. The audio playback device 110 includes an enclosure 210 (a/k/a "housing"). On the enclosure 210 there resides a graphical interface 212 (e.g., an OLED display) which can provide the user with information regarding currently playing ("Now Playing") music. There are one or more electro-acoustic transducers 215. The audio playback device 110 also includes a user input interface 216. The user input interface 216 can include a plurality of preset indicators, which can be hardware buttons. The preset indicators can provide the user with easy, one press access to entities assigned to those buttons.

The audio playback device 110 also includes a network interface 220, a processor 222, audio hardware 224, power supplies 226 for powering the various components, and memory 228. Each of the processor 222, the graphical interface 212, the network interface 220, the audio hardware 224, the power supplies 226, and the memory 228 are interconnected using various buses, and several of the components may be mounted on a common motherboard or in other manners as appropriate.

The network interface 220 provides for communication between the wireless speaker package 200 and audio sources and other networked wireless speaker packages and other audio playback devices via one or more communications protocols. The network interface 220 may provide either or both of a wireless interface 230 and a wired interface 232. The wireless interface 230 allows the wireless speaker package 200 to communicate wirelessly with other devices in accordance with a communication protocol such as IEEE 802.11 b/g/n/ac. The wired interface 232 provides network interface functions via a wired (e.g., Ethernet) connection.

In some cases, the network interface 220 may also include a network media processor 234 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device.

All other digital audio coming from network packets comes straight from the network media processor 234 through a USB bridge 236 to the processor 222 and runs into the decoders, DSP, and eventually is played back (rendered) via the electro-acoustic transducer(s) 215. The network interface 220 can also include a Bluetooth circuitry 238 for Bluetooth applications (e.g., for wireless communication with a Bluetooth enabled audio source such as a smartphone or tablet).

Streamed data passes from the network interface 220 to the processor 222. The processor 222 can execute instructions within the wireless speaker package (e.g., for performing, among other things, digital signal processing, decoding, and equalization functions), including instructions stored in the memory 228. The processor 222 may be implemented as a chipset of chips that include separate and multiple analog and digital processors. The processor 222 may provide, for example, for coordination of other components of the audio playback device 110, such as control of user interfaces, applications run by the audio playback device 110.

The processor 222 provides a processed digital audio signal to the audio hardware 224 which includes one or more digital-to-analog (D/A) converters for converting the digital audio signal to an analog audio signal. The audio hardware 224 also includes one or more amplifiers which provide amplified analog audio signals to the electroacoustic transducer(s) 215 for playback. In addition, the audio hardware 224 may include circuitry for processing analog input signals to provide digital audio signals for sharing with other devices.

The memory 228 may include, for example, flash memory and/or non-volatile random access memory (NVRAM). In some implementations, instructions (e.g., software) are stored in an information carrier. The instructions, when executed by one or more processing devices (e.g., the processor 222), perform one or more processes, such as those described elsewhere herein. The instructions can also be stored by one or more storage devices, such as one or more computer- or machine-readable mediums (for example, the memory 228, or memory on the processor). The instructions may include instructions for performing decoding (i.e., the software modules include the audio codecs for decoding the digital audio streams), as well as digital signal processing and equalization.

Figure 3:
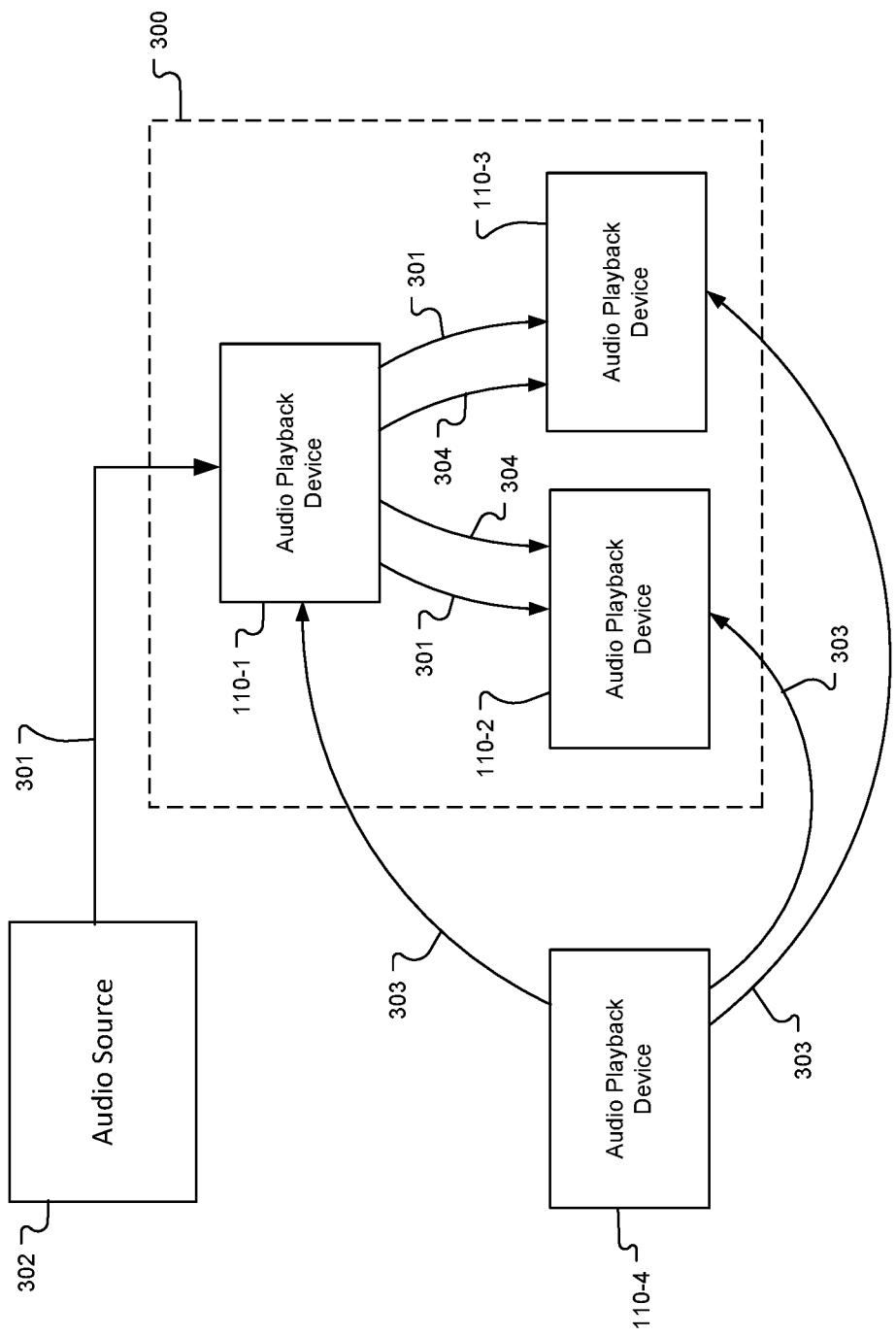
FIG. 3 is functional block diagram of a grouping of audio playback devices from the system of FIG. 1 arranged for synchronized playback of audio.

FIG. 3 is a schematic illustration of a playback group 300 formed from a plurality of the audio playback devices 110-1, 110-2, 110-3 in the audio distribution system of FIG. 1. In the illustrated arrangement, one of the audio playback devices (audio playback device 110-1 in this case) functions as a master audio device and the other audio playback devices in the group 300 (i.e., audio playback devices 110-2 & 110-3) function as audio slaves.

The master device 110-1 receives audio data 301 from an audio source 302 (i.e., one of 130 or 142 of FIG. 1) and distributes it to the slave devices 110-2 and 110-3. In this non-limiting example, such audio distribution can be by WiFi via wireless access point/router (item 114, FIG. 1). Alternatively or additionally, the audio distribution can be by way of a wired (e.g., Ethernet) connection, or a combination of wired and wireless connections. Each of the audio devices 110-1, 110-2, and 110-3 in the group 300 will play the audio. The audio replay among the devices in the group is synchronized such that they all play the same audio at the same time.

To help ensure that the playback of the audio content is and remains synchronized, the respective internal clocks (a/k/a "local clocks") of the individual audio playback devices within the group 300 are synchronized. In principle, such clocks comprise an oscillator and a counter. During synchronized (a/k/a "multi-room") playback, a protocol, such as Network Time protocol (NTP), or the like, is utilized to distribute timing information in a clock master-slave relationship to keep the current clock time on all the devices in the group 300 synchronized.

The time synchronization protocol is separate and aside from the audio stream. In that regard, one of the audio playback devices (audio playback device 110-4 in this case) is designated as a clock master. Notably, the clock master is intentionally a different device than the audio master, and, in the illustrated example, is not even a member of the playback group 300 (i.e., in the illustrated implementation, the audio playback device 110-4 does not render audio in synchrony with the devices in the group 300).

The clock master provides clock data 303 (i.e., the clock master acts as a time server) to the audio playback devices 110-1, 110-2, 110-3 in the group 300 (a/k/a "clock slaves"), which then use that clock data to update their respective clocks to synchronize with that of the clock master. The clock data may be provided periodically, e.g., every 1 to 6 seconds, to keep the grouped devices updated and in sync with the clock master.

Separately, the audio master may also provide a "play at" time 304; i.e., an identification of when all the devices in the group should begin playing the distributed audio content. The "play at" time 304 may represent a clock time at which the units are to render a first sample in a series of ordered audio data samples, with the remainder of the audio data samples to be played in order at a defined sample rate. The "play at" time 304 is communicated in control data that is separate from the audio stream and, in some cases, is only sent once for each track (i.e., it is not included with every frame). Every new track or stream will get a new "play at" time.

The audio slaves receive the first sample in an audio stream 301 and begin playback designated "play at" time 304. Since all the grouped devices are synced to the clock master, and, thus, all have the same current clock time, they all begin playback at the same time. From there, the devices can all provide playback at a constant sample rate, and, consequently, stay in sync.

Figure 4:
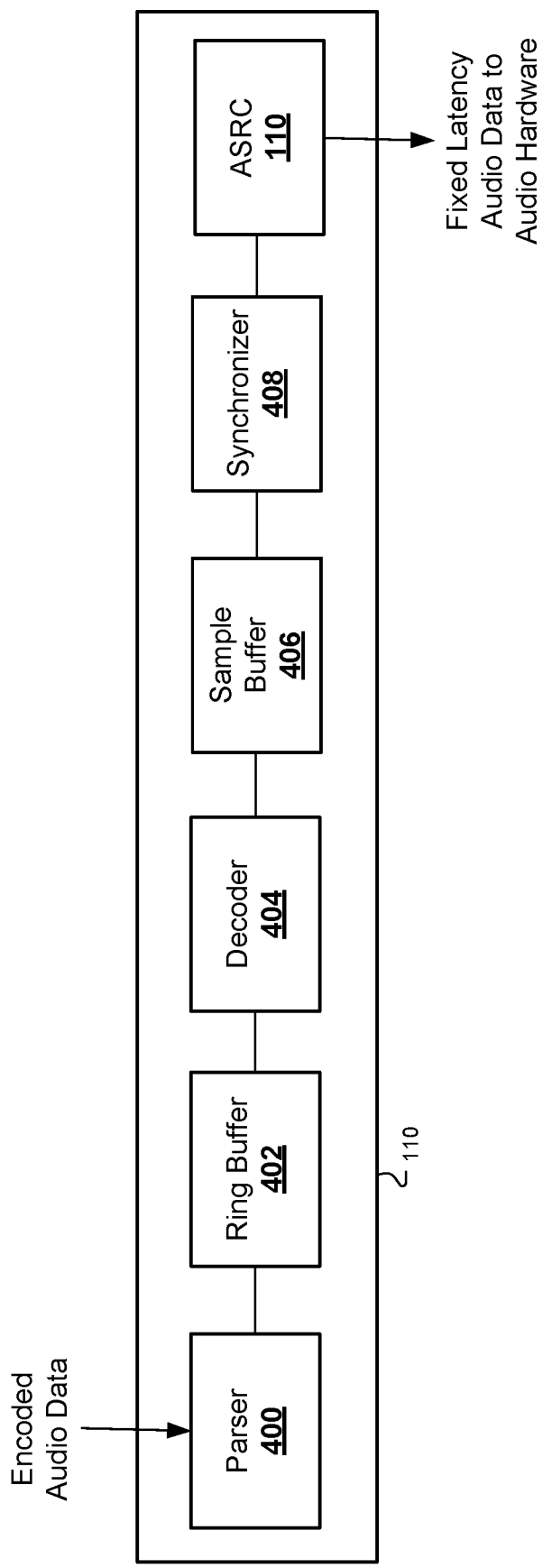
FIG. 4 is a schematic block diagram of functional aspects of an audio playback device from the system of FIG. 1.

With reference to FIG. 4, each audio playback device 110 includes a parser 400; a ring buffer 402; a decoder 404; a sample buffer 406; a synchronization module 408; and an asynchronous sample rate converter (ASRC) 410. These components may be in addition to the components illustrated in FIG. 2 or may be 25 included in, for example, the processor 222, audio hardware 224, and/or memory 228 illustrated in FIG. 2. At the beginning of a stream, the data (e.g., encoded audio) starts to flow to the master audio playback device (a/k/a "audio master") where it is parsed by the audio master's parser 400 to identify frame boundaries. The parser 400 strips away any container (e.g., MP3) that encoded audio is packed in and puts it into custom audio frames. The parsed but still encoded data is stored in the audio master's ring buffer 402. Next, the encoded data is decoded and a time offset is generated and affixed to the header of the audio frame and the decoded audio frames are stored in the sample buffer 406. The offset represents a time difference between the time when playback of the corresponding frame should start and the "play at" time. The offset is used by the synchronization module 408 to determine when the audio samples from the corresponding audio frame are fed into the ASRC 410. The ASRC 410 ensures a constant sample-rate for rendering.

For synchronized playback, the encoded data is immediately pulled out of the audio master's ring buffer 402 and is provided to the slave playback device(s) (a/k/a audio slave(s)) ring buffer 402. This distribution of encoded audio data may take place via unicast communications between the audio master and each of the individual audio slave devices. From there, the audio slaves follow the same process as outlined above with respect to the audio master. Each audio slave will decode the encoded audio pulled from the audio master, assign an offset to the frame header, and store the decoded audio frames in their respective sample buffers 406. The audio slaves each apply their own offsets to the audio frames, but these offsets will be the same as those applied by the audio master since each device is receiving the same stream and is using the same audio decoder software.

Since the clocks on the audio master and audio slaves are in sync and the offsets are all the same, each device in the group (e.g., group 300, FIG. 3) will feed the same data into its ASRC 410 at the same time. The ASRCs 410 ensure that each device outputs the audio at the same, constant rate. The oscillators on the individual devices may spin at different rates, which could lead to time drift among the devices despite the timing synchronization. Synchronization adjustments to the clock time may cause the duration of audio that the corresponding slave device needs to play to stay in sync to either grow or shrink. The ASRCs 410 on each device account for these time adjustments and manipulate the received audio data to ensure a constant sample output rate.

Figure 5:
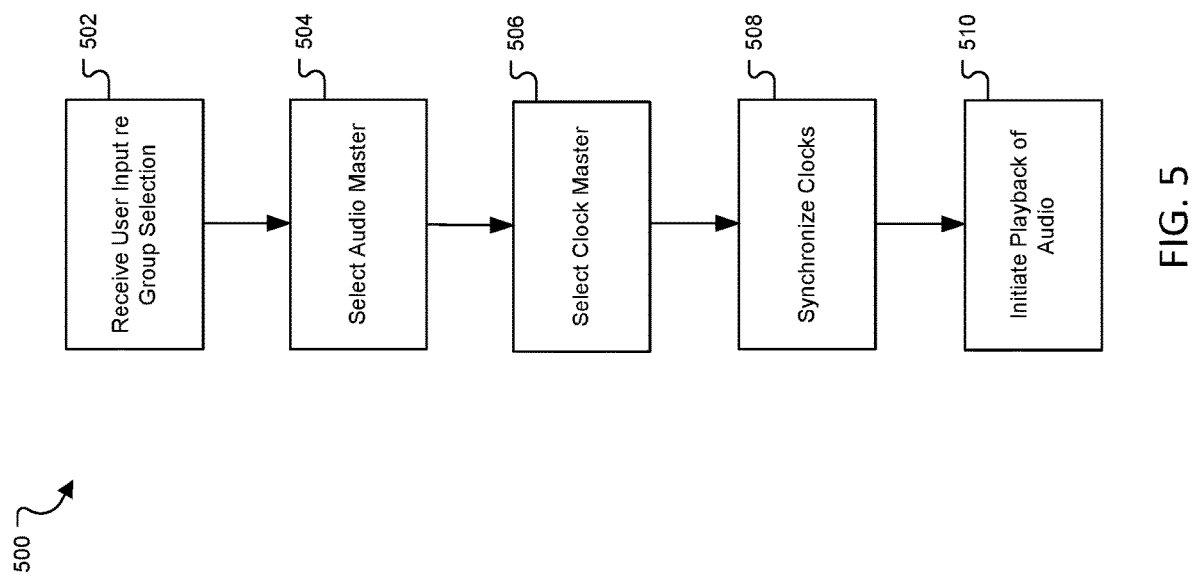
FIG. 5 is a flowchart of an example process for synchronizing audio playback among a group of audio playback devices.

FIG. 5 is a flowchart of an example process 500 for assignment of roles (i.e., master/slave roles) during group formation. In some implementations, the process 500 can be executed, at least in part, by the processor 222 (FIG. 2) of one or more of the audio playback devices executing instructions stored in memory 228 (FIG. 2). Operations of the process 500 include receiving user instructions regarding the formation of a group (502). In that regard, a group is typically formed via input in a user interface provided on a controller device, such as the PC 126 or mobile device 128 of FIG. 1. The user selects a first device (i.e., a first one of the audio playback devices 110) to serve as the basis for a group, and then grows the group by selecting, via the user interface, other ones of the audio playback devices to join the group. Alternatively or additionally, in some implementations, the user can select multiple devices at once to create a group. Also, in some implementations, there can be a persistent group or construct, that can be saved and later selected for playback. For example, in some implementations, a predefined group may be selected via a voice directive, e.g. "play music downstairs" as a voice directive that automatically starts playing music from a preset ("persistent") group. Information regarding the group selection is transmitted to, and received (502) by one or more the audio playback devices.

The process 500 also includes the selection of an audio master device (504). In some instances, the audio master is automatically set to the audio playback device that was selected to serve as the basis for the group. Alternatively, the device within the group that has the strongest WiFi signal strength may be selected as the audio master. For example, each of the audio playback devices in the group may communicate its signal strength to the other group members. Once each of the devices in the group has received the signal strength information from each of the other group members, each device will identify the group member with the highest/ strongest signal strength as the audio master for the group. Alternatively or additionally, the group members may all report their respective signal strengths to one network device (e.g., the controller device) and that network device may identify the audio master to the group members.

To ensure that the audio output from the audio playback devices is truly synchronized, the respective clocks of the audio playback devices are all synchronized. To achieve this clock synchronization, one of the audio playback devices is selected to serve as a clock master (506). The clock master distributes a reference time that all the audio playback devices in the group synchronize their respective clocks to.

The clock master may be one of the audio playback devices in the group, or may be an audio playback device outside of the group; however, the clock master is selected such that no audio playback device can concurrently serve as both the audio master and the clock master. In that regard, the clock master can be selected according to a leader selection algorithm (a/k/a "leader election algorithm" or "leader election") that excludes the audio master from consideration. In distributed computing, leader election is the process of designating a single node as the organizer of some task distributed among several computers (nodes), which in this case are the audio playback devices 110. Before the task is begun, all network nodes are either unaware which node will serve as the "leader" (or coordinator) of the task, or unable to communicate with the current coordinator. After a leader election algorithm has been run, however, each node throughout the network recognizes a particular node as the task leader.

The network nodes communicate among themselves to decide which of them will get into the "leader" state. For that, they need some method to break the symmetry among them. For example, if each node has unique and comparable identities, then the nodes can compare their identities, and decide that the node with the highest identity is the leader. In some cases, the leader selection algorithm can select the clock master to be the playback unit that reports the lowest ping time.

For example, each of the audio playback devices in the group may ping the access point (item 114, FIG. 1) and communicate its ping time (i.e., a round-trip time for messages sent from the audio playback device to the access point that are echoed back to the audio playback device) to the other group members. Once each of the devices in the group has received the respective ping times from each of the other group members, each device will identify the group member (excluding the audio master) with the shortest ping time as the clock master for the group. Alternatively, as mentioned above, the process of selecting the clock master can be extended to include all the audio playback devices in a system (such as system 100, FIG. 1), and, thus, is not necessarily limited to only the members of a playback group. In which case, the clock master can be selected from the system device (excluding the audio master) that reports the lowest ping time, whether or not it is part of the playback group.

In some implementations, the audio playback devices may be arranged in a peer-to-peer network that includes the access point. In such configurations, the clock master may be selected to be the audio playback device that records the shorted ping time with the access point, as described above, or, alternatively, the clock master may be determined based on ping times among the nodes of the peer-to-peer networks. For example, the clock master may be selected to be the audio playback device (e.g., excluding the audio master) that records the smallest mean ping time with the other network nodes.

With a clock master selected, the members of the group, including the audio master, can begin to synchronize (508) the clock master's clock. In some cases, the clocks of the audio playback devices can be synchronized to the master clock time according to a linear time model $m_n x + b_n$, where $m_n$ is the rate difference between the master's clock and the clock of slave$_n$, x represents the current clock time on slave$_n$, and $b_n$ is the offset between the master clock and the clock of slave$_n$ since booting up. In some cases, $m_n$ and $b_n$ are determined by performing a linear fit of collected timestamps from clock master and local clock over a given window of time. With this model in place, the devices can maintain some degree of synchronization even in the event that the clock master needs to be changed.

In that regard, there are two situations in which a new clock master may be required: 1.) if the current clock master loses power; or 2.) if the clock master becomes the audio master—such as may occur when the current clock master is selected as the head of a new grouping. In either case, the leader selection algorithm restarts. At this point, the system is in an "open loop" state in which the audio playback devices initially maintain clock synchronization using their existing, respective $m_n$ and $b_n$ values. Then, once a new clock master is selected, the other audio playback devices start slowly adjusting their clocks to that of the new clock master using a heuristic approach which causes the audio playback devices to adjust their respective m and b values based on the new master clock, while the new clock master slowly reduces its rate to zero, such that $m_{master}=1$, and $b_{master}=0$.

Figure 6:
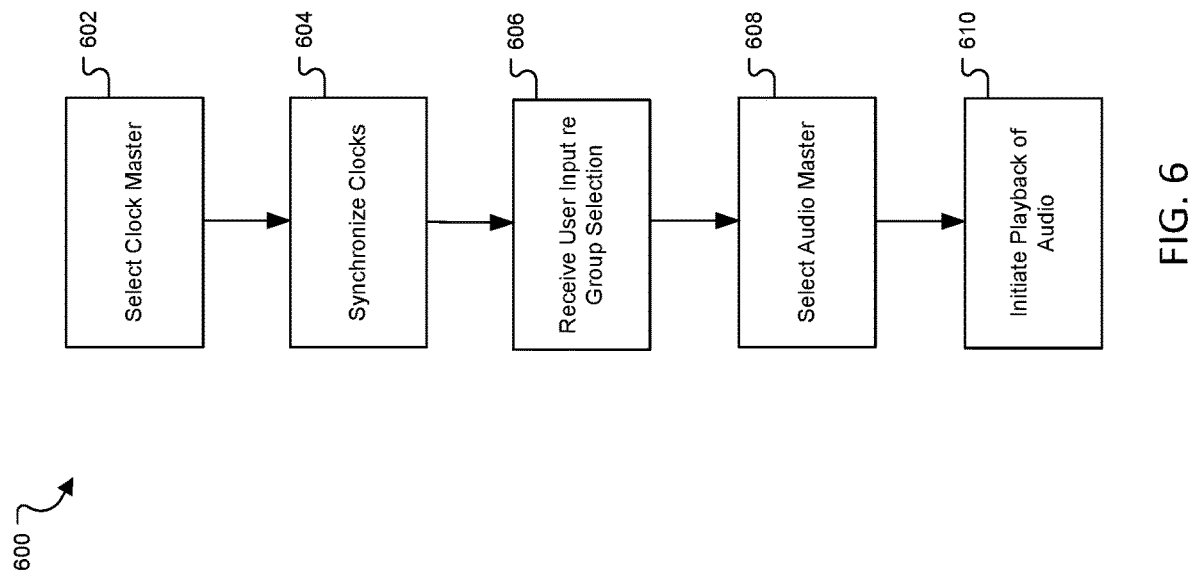
FIG. 6 is a flowchart of another example process for synchronizing audio playback among a group of audio playback devices.

Referring to FIG. 6, in an alternative embodiment (600), the clock master can be selected (602) before a group is formed (606) and/or before an audio master is selected (608). This can beneficially allow the audio playback devices to be clock synchronized ("pre-synced") (604) before audio content is selected for playback, which can ultimately allow for a shorter delay before playback begins (610). In this embodiment, the clock master can be selected using a similar leader selection algorithm to that described above, but without having to exclude the audio master. The audio master can then be determined at some later time. In that regard, the audio master can be selected by a master selection algorithm that excludes the clock master from consideration.

The master selection algorithm may select (608) the audio master based on the audio playback device within a playback group that reports the strongest WiFi signal connection, excluding any device that is serving as the clock master. Alternatively, the audio master may be selected (608) based on the audio playback device within a playback group that reports the strongest WiFi signal connection, regardless of whether that device is also serving as the clock master. In which case, if the clock master is subsequently selected (608) as the audio master, then a new clock master can be selected while or after playback of the selected audio begins—that is, the audio playback devices within the group can still take advantage of the fact that their clocks were pre-synched while a new clock master is selected.

While implementations have been described in which an audio playback device may not contemporaneously serve as both an audio master and a clock master for a playback group, it is contemplated that an audio playback device may serve as a clock master for one playback group, while also serving as an audio master for another, different playback group within the same audio distribution system.

In some implementations, the audio source is connected to one of the audio playback devices of a playback group via a personal area network (PAN) (e.g., via a Bluetooth connection). In such cases, the device that is coupled to the audio source can be selected as the audio master—that selection can then be communicated from the audio master to the other devices in the group via the LAN.

In certain implementations, the audio source is connected to one of the audio playback devices of a playback group via a hardwire connection through an auxiliary input port on the audio playback device. In such cases, the device that is directly coupled to the audio source can be selected as the audio master—that selection can then be communicated from the audio master to the other devices in the group via the LAN.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.]

A number of implementations have been described. Nevertheless, it will be understood that additional modifications may be made without departing from the scope of the inventive concepts described herein, and, accordingly, other implementations are within the scope of the following claims.

What is claimed is:

1. A system including a plurality of audio playback devices in communication with each other, the system comprising:
   a first audio playback device of the plurality of audio playback devices, wherein the first audio playback device is configured to distribute audio content to at least one other audio playback device of the plurality of audio playback devices; and
   a second audio playback device of the plurality of audio playback devices, the second audio playback device different from the first audio playback device, wherein the second audio playback device is configured to distribute clock information to at least one other audio playback device of the plurality of audio playback devices.

2. The system of claim 1, wherein the at least one other audio playback device that is configured to receive audio content from the first audio playback device includes the second audio playback device.

3. The system of claim 1, wherein the at least one other audio playback device that is configured to receive clock information from the second audio playback device includes the first audio playback device.

4. The system of claim 1, wherein the at least one other audio playback device that is configured to receive audio content from the first audio playback device is in a group with the first audio playback device, and wherein the group is configured to render the audio content in synchrony.

5. The system of claim 4, wherein the at least one other audio playback device that is configured to receive audio content from the first audio playback device includes the second audio playback device.

6. The system of claim 4, wherein the at least one other audio playback device that is configured to receive clock information from the second audio playback device includes the first audio playback device, and wherein the second audio playback device is outside of the group.

7. The system of claim 1, wherein the second audio playback device is selected according to an algorithm that excludes the first audio playback device from consideration.

8. The system of claim 1, wherein the second audio playback device is configured to distribute clock information to the at least one other audio playback device before the first audio playback device is configured to distribute audio content to the at least one other audio playback device.

9. The system of claim 1, further comprising a third audio playback device of the plurality of audio playback devices, the third audio playback device different from the first and second audio playback devices, wherein in response to the second audio playback device losing power or being configured to distribute audio content to at least one other audio playback device of the plurality of audio playback devices, the second audio playback device is no longer configured to distribute the clock information and the third audio playback device is configured to distribute the clock information.

10. The system of claim 1, wherein the first audio playback device is further configured to, in addition to distributing audio content to at least one other audio playback device, distribute an identification of when the audio content should be played.

11. A method of distributing audio content to and synchronizing audio data among a plurality of audio playback devices that are in communication with each other, the method comprising:
distributing, by a first audio playback device of the plurality of audio playback devices, audio content to at least one other audio playback device of the plurality of audio playback devices; and
distributing, by a second audio playback device of the plurality of audio playback devices, clock information to at least one other audio playback device of the plurality of audio playback devices,
wherein the second audio playback device is different from the first audio playback device.

12. The method of claim 11, wherein the at least one other audio playback device that receives audio content from the first audio playback device includes the second audio playback device.

13. The method of claim 11, wherein the at least one other audio playback device that receives clock information from the second audio playback device includes the first audio playback device.

14. The method of claim 11, wherein the at least one other audio playback device that receives audio content from the first audio playback device is in a group with the first audio playback device, and wherein the group is configured to render the audio content in synchrony.

15. The method of claim 14, wherein the at least one other audio playback device that receives audio content from the first audio playback device includes the second audio playback device.

16. The method of claim 14, wherein the at least one other audio playback device that receives clock information from the second audio playback device includes the first audio playback device, and wherein the second audio playback device is outside of the group.

17. The method of claim 11, further comprising selecting the second audio playback device according to an algorithm that excludes the first audio playback device from consideration.

18. The method of claim 11, wherein the second audio playback device distributes clock information to the at least one other audio playback device before the first audio playback device distributes audio content to the at least one other audio playback device.

19. The method of claim 11, further comprising selecting a third audio playback device of the plurality of audio playback devices to distribute the clock information to the at least one other audio playback device, the third audio playback device different from the first and second audio playback devices, wherein the selecting is in response to the second audio playback device losing power or being configured to distribute audio content to at least one other audio playback device of the plurality of audio playback devices.

20. The method of claim 11, further comprising distributing, by the first audio playback device, in addition to distributing audio content to at least one other audio playback device, an identification of when the audio content should be played.

* * * * *